(12) United States Patent
Golden

(10) Patent No.: US 10,404,640 B2
(45) Date of Patent: Sep. 3, 2019

(54) SYSTEMS AND METHODS FOR PROVIDING ONLINE CHAT-MESSAGES WITH CONFIGURABLE, INTERACTIVE IMAGERY

(71) Applicant: Casey Golden, Brookyln, NY (US)

(72) Inventor: Casey Golden, Brookyln, NY (US)

( * ) Notice: Subject to any disclaimer, the term of this patent is extended or adjusted under 35 U.S.C. 154(b) by 0 days.

(21) Appl. No.: 16/029,951

(22) Filed: Jul. 9, 2018

(65) Prior Publication Data
US 2019/0020615 A1 Jan. 17, 2019

Related U.S. Application Data

(60) Provisional application No. 62/532,527, filed on Jul. 14, 2017.

(51) Int. Cl.
*H04L 12/58* (2006.01)
*H04L 29/06* (2006.01)
*G06F 3/0481* (2013.01)

(52) U.S. Cl.
CPC ............. *H04L 51/10* (2013.01); *H04L 51/04* (2013.01); *H04L 65/1069* (2013.01); *G06F 3/0481* (2013.01); *H04L 51/046* (2013.01)

(58) Field of Classification Search
CPC ........ H04L 51/04; H04L 51/046; H04L 51/10
See application file for complete search history.

(56) References Cited

U.S. PATENT DOCUMENTS

| 9,191,615 | B1 | 11/2015 | Valimaki et al. | |
|---|---|---|---|---|
| 2008/0028323 | A1* | 1/2008 | Rosen | G06Q 10/10 715/752 |
| 2012/0191577 | A1 | 7/2012 | Gonsalves et al. | |
| 2013/0231990 | A1 | 9/2013 | Munjal et al. | |
| 2013/0346885 | A1 | 12/2013 | Singh et al. | |
| 2014/0280603 | A1* | 9/2014 | Rideout | H04L 51/046 709/205 |
| 2015/0235289 | A1 | 8/2015 | Jeremias | |
| 2015/0281145 | A1 | 10/2015 | Ji | |

(Continued)

FOREIGN PATENT DOCUMENTS

WO WO 2015/066891 5/2015

OTHER PUBLICATIONS

International Patent Application No. PCT/US2018/041202, International Search Report and Written Opinion dated Sep. 20, 2018.

*Primary Examiner* — Jeong S Park
(74) *Attorney, Agent, or Firm* — Kilpatrick Townsend & Stockton LLP

(57) ABSTRACT

One illustrative method disclosed herein includes receiving a request associated with a website from a first client device. The method can include providing program code for a first chat interface to the first client device in response to the request. The program code can cause the first chat interface to be integrated with the website within a website browser and enable a user to selectively include at least two images from the website into a chat message. The method can include establishing a chat session between the first client device and a second client device. The method can include receiving the chat message from the first client device, the chat message including the at least two images from the website. The method can include transmitting the chat message to the second client device.

22 Claims, 7 Drawing Sheets

(56) References Cited

U.S. PATENT DOCUMENTS

2016/0014059 A1\* 1/2016 Rathod ............... H04L 12/1818
  715/752
2016/0050165 A1   2/2016 Thomas et al.
2016/0099892 A1\* 4/2016 Palakovich ............. H04L 51/04
  709/206
2017/0148072 A1\* 5/2017 Goodwin ............ G06Q 20/102

\* cited by examiner

SYSTEMS AND METHODS FOR PROVIDING ONLINE CHAT-MESSAGES WITH CONFIGURABLE, INTERACTIVE IMAGERY

CROSS REFERENCE TO RELATED APPLICATIONS

This claims the benefit of priority under 35 U.S.C. § 119(e) to U.S. Provisional Patent Application No. 62/532,527, filed Jul. 14, 2017, the entirety of which is hereby incorporated by reference herein.

TECHNICAL FIELD

The present disclosure relates generally to online messaging. More specifically, but not by way of limitation, this disclosure relates to systems and methods for providing online chat-messages with configurable, interactive imagery.

BACKGROUND

Websites can include chat interfaces that allow two or more users to communicate with one another in substantially real time over the Internet. Typical chat interfaces are designed for textual communication and, in limited circumstances, allow a user to attach a single image to a chat message.

SUMMARY

Systems and methods of the present disclosure are related to online messaging. One exemplary method of the present disclosure includes receiving a request associated with a web site from a first client device. The method can include providing program code for a first chat interface to the first client device in response to the request. The program code can cause the first chat interface to be integrated with the website within a website browser and enable a user to selectively include at least two images from the website into a chat message. The method can include establishing a chat session between the first client device and a second client device. The method can include receiving the chat message from the first client device, the chat message including the at least two images from the website. The method can include transmitting the chat message to the second client device. The method may be implementing by any suitable computing device, such as a server.

Another exemplary method of the present disclosure includes generating a chat interface that is integrated with a web site within a web site browser. The method can include detecting a user interaction associated with at least two images on the website. The method can include, in response to detecting the user interaction, generating a chat message that includes the at least two images within the chat interface. The method can include transmitting the chat message to a remote client device using the chat interface. The method may be implementing by any suitable computing device, such as a client device.

Some examples of the present disclosure include a system with a processing device and a memory device. The memory device includes instructions executable by the processing device for causing the processing device to implement some or all of the steps of the above method(s). Yet another example of the present disclosure includes a non-transitory computer-readable medium comprising program code that is executable by a processing device for causing the processing device to implement some or all of the steps of the above method(s).

These illustrative examples are mentioned not to limit or define the limits of the present subject matter, but to aid understanding thereof illustrative examples are discussed in the Detailed Description, and further description is provided there. Advantages offered by various examples may be further understood by examining this specification and/or by practicing one or more examples of the claimed subject matter

BRIEF DESCRIPTION OF THE DRAWINGS

A full and enabling disclosure is set forth more particularly in the remainder of the specification. The specification makes reference to the following appended figures.

DETAILED DESCRIPTION

Figure 1:
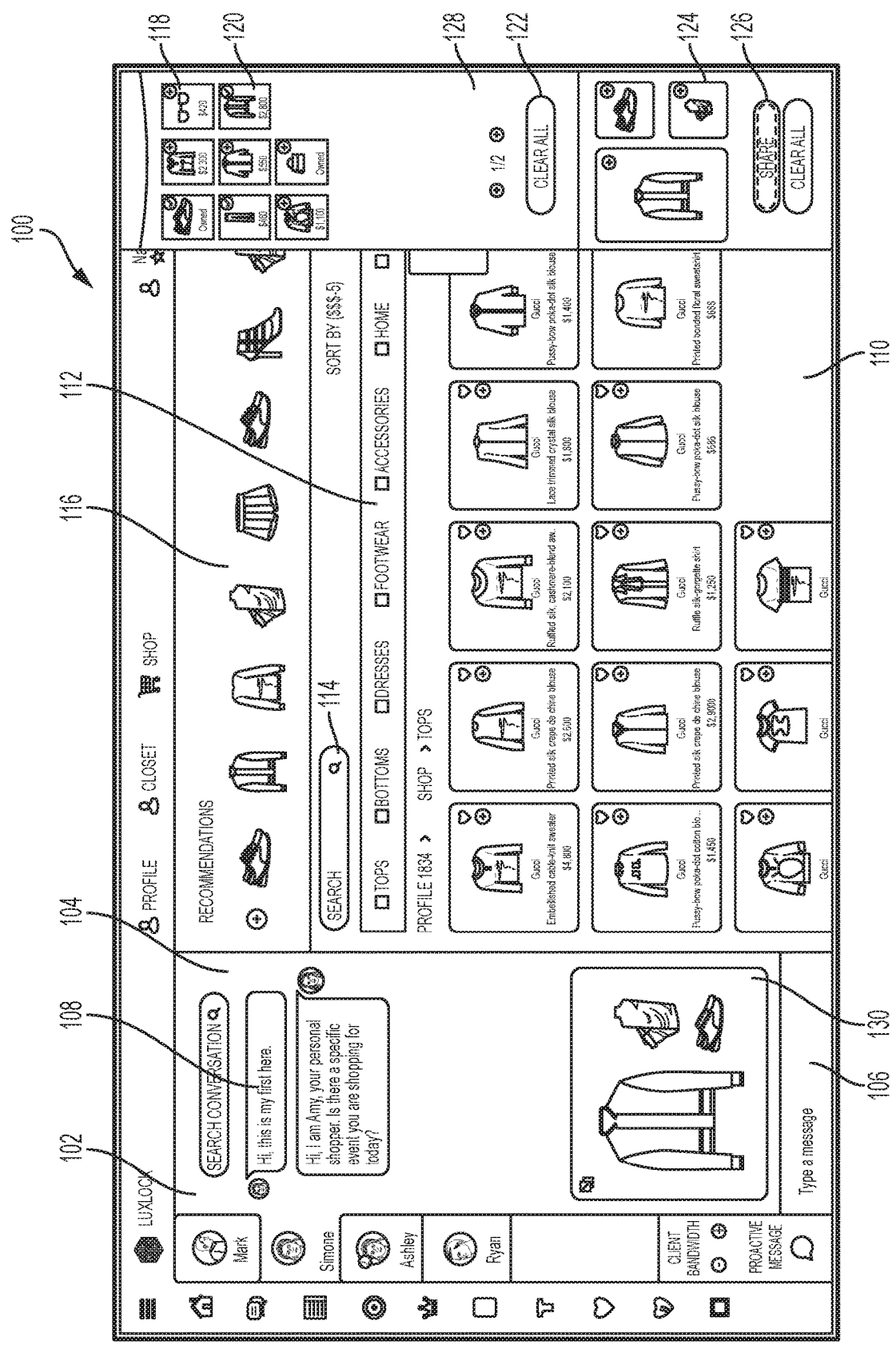
FIG. 1 shows an example of a web site with a chat interface for implementing some aspects of the present disclosure.

Traditional chat interfaces have a variety of problems. For example, traditional chat interfaces only allow a user to attach a single image, typically a thumbnail link, to a chat message. This requires the user to send several, separate chat messages if the user wishes to send multiple images to other users. Since each chat message has at least some common information, such as formatting and protocol data (e.g., header data, a checksum, etc.), sending each image in a separate chat message requires this common information to be repeatedly transmitted, which consumes valuable bandwidth and system resources. Also, it can be challenging for a user to meaningfully convey information to the other users with combinations of images if each image has to be transmitted one-at-a-time, sequentially. Traditional chat interfaces have other problems, too. For example, traditional chat messages are static (e.g., unchanging and non-interactive), which limits the amount of information that can be conveyed via a chat message and requires a user to open a new browser window to obtain more details about an image conveyed in the chat message.

Some examples of the present disclosure can overcome some or all of the abovementioned problems. For example, a chat interface of the present disclosure may enable a user to combine multiple images into a single chat message, thereby reducing or eliminating repeated transmissions of common information. This, in turn, may reduce the consumption of valuable bandwidth and system resources. The chat interface can additionally or alternatively enable a user to customize the spatial arrangement and/or sizes of the images relative to one another within a chat message, so that the user can more meaningfully convey information using imagery. The chat interface can additionally or alternatively enable chat messages to be dynamic or interactive, which can improve engagement and conveyance of information.

Reference will now be made in detail to various and alternative illustrative examples and to the accompanying drawings. Each example is provided by way of explanation and not as a limitation. It will be apparent to those skilled in the art that modifications and variations can be made. For instance, features illustrated or described as part of one example may be used in another example to yield a still further example. Thus, it is intended that this disclosure include modifications and variations as come within the scope of the appended claims and their equivalents.

Illustrative Example of Providing Online Chat-Messages with Configurable, Interactive Imagery One example of the present disclosure includes a chat interface integrated into a website. A user can access the website using a website browser and converse with an agent (e.g., another user) using the chat interface, for example, to ask the agent questions about various items on the website. The agent can have her own chat interface through which she can send chat messages to the user. This real-time, two-way communication between the user and the agent can be referred to as a chat.

In some circumstances, the agent may wish to send several images to the user simultaneously in a single chat message. For example, the user may be searching for an outfit on the web site and request the help of the agent. So, the agent can search through various items on the website to identify items to provide to the user. The agent can select the items and the agent's chat interface can responsively (e.g., automatically) integrate images of the items into a draft chat message. The agent can then further customize the draft chat message. For example, the agent can add text to the draft chat message, customize how the images are spatially arranged relative to one another (e.g., to overlay a necklace image over a shirt image), customize the sizes of the images, or any combination of these. Being able to customize the spatial arrangement and sizes of the images may allow the agent to more meaningfully convey information to the user visually with the images.

In some examples, the chat interface can also retrieve additional information related to the items (e.g., from a database or the website's content) and incorporate the additional information into the chat message as visible text or hidden metadata. Examples of the additional information can include data about an item, such as a description, availability, color, or size of the item; a video about the item; an additional image of the item; or any combination of these.

Once the agent is happy with the draft chat message, the agent can send the chat message to the user. This may take less bandwidth and system resources (e.g., RAM and processing power) to send to the user than if each image was sent in a separate chat message. The user's chat interface can receive the chat message and responsively display the chat message in a chat window. The chat message can be displayed such that the images in the chat message are spatially arranged as designated by the agent. For example, the chat message can have an image at least partially overlaying another image, an image vertically or horizontally offset relative to another image, an image positioned adjacent to another image, an image positioned diagonal to another image, or any other suitable arrangement of images. The images can also have the sizes designated by the agent. For example, one image may be larger or smaller than another image.

In some examples, the user's chat interface can enable a user to interact with the chat message. For example, the user's chat interface can allow the user to select, expand, contract, rotate, move, overlay, and/or otherwise manipulate the images (e.g., within the boundaries of the chat message or the chat window). As a particular example, the user can select an image in the chat message and the user's chat interface can responsively expand the image, display additional information about a product in the image, and/or display an option to purchase the product or add the product to a wish list or shopping cart. As another example, the user can select a grouping of images in the chat message and the chat interface can responsively reorganize the images into an image carousel, in which only one image is displayed at a time and the user can selectively cycle through the images. The image carousel may also provide additional information about an item shown in the displayed image, which can allow the user to easily switch between and compare items. In some examples, the chat interface can allow a user to move (e.g., drag-and-drop) an image from the chat message into another chat message, for example, to compare an item in the image with another item in the other chat message.

As the user interacts with her chat interface (e.g., the chat message in the chat interface), the user's chat interface can detect the interaction and responsively transmit information about the interaction back to the agent's chat interface. For example, the user's chat interface can detect if the user selects an image provided in the chat message, expands the image, watches a video associated with the image, adds an item shown in the image to a shopping cart or wish list, cycles to the image in an image carousel, views a hyperlink in the chat message, and/or selects a hyperlink in the chat message. In response, the user's chat interface can transmit information describing the interaction back to the agent's chat interface. For example, the user's chat interface can transmit a chat message to the agent's chat interface indicating that the user expanded an image, watched a video, or selected a hyperlink. This can enable the agent to monitor the user's activity and engagement (e.g., in substantially real time).

The above description is provided merely as an example. Various other examples are described herein and variations of such examples would be understood by one of skill in the art. Advantages offered by various examples may be further understood by examining this specification and/or by practicing one or more examples of the claimed subject matter.

Illustrative Platforms and Interfaces for Providing Online Chat-Messages with Configurable, Interactive Imagery FIG. 1 shows an example of a website 100 with a chat interface 102 for implementing some aspects of the present disclosure. The website 100 depicts an agent's side of an underlying web-based platform that is accessible to the agent after logging in. The agent's side may have different website features than the user's side, and the agent's chat interface 102 may have different features than the user's chat interface (e.g., as described below in greater detail with respect to FIGS. 2-3).

The chat interface 102 includes a chat window 104 with a data entry field 106 through which the agent can insert text to transmit in chat messages 108 to the user. Each chat message can be displayed with an indicator (e.g., a photo or username) of the person that sent the chat message. In this example, the chat window 104 substantially covers a vertical length of the website 100 and is positioned on the left side of the website 100, but other configurations and orientations are possible.

As the agent interacts with the user via the chat interface 102, the agent can also browse various items listed in another portion 110 of the website 100. The items can be classified by type and filtered using a filter bar 112 or search bar 114. In this example, the filter bar 112 designates various filter categories including tops, bottoms, dresses, footwear, accessories, and home, but other filter categories are possible. The website 100 can additionally or alternatively include recommended items 116 that are specifically tailored to the user through which the agent can browse. The website 100 can determine the recommended items 116 using artificial intelligence, the user's preferences (e.g., as determined by analyzing the user's history from one or more partner websites), or any combination of these. In some examples, the agent can interact with a link on the website 100 (e.g., the "Closet" link) to view additional items through which the agent can browse. The additional items can include, for example, items previously purchased by the user, items in the user's wishlist, items the user added to the wishlist or shopping cart but subsequently removed (which can be referred to as "abandoned items"), items purchased and subsequently returned by the user, or any combination of these.

While browsing the items, the agent may identify certain items of interest and wish to add those items to a list 118 for future use. So, the agent can select the items (e.g., by clicking icons associated with the items) and the website 100 can responsively add the items to the list 118. Adding an item to the list 118 can involve adding an image 120 of the item to the list 118. In this example, the list 118 is within a sidebar 128 that substantially covers a vertical length of the website 100 and is positioned on the right side of the website 100. But other configurations and orientations are possible. The agent can add any number and combination of items to the list 118, selectively delete items from the list 118, and clear the entire list (e.g., by selecting a "clear all" button 122).

In some examples, the agent may wish to share one or more items in the list 118 in a chat message. To do so, the agent can select items from the list 118 to include in the chat message. As the agent selects each item from the list 118, the website can responsively display a check mark adjacent to the item (e.g., as shown in FIG. 1) to indicate that the item has been selected. The website 100 can also add an image of each item can to a design area 124. Alternatively, the agent can drag-and-drop an item from elsewhere on the website 100 (e.g., portion 110 of the website 100) into the design area 124.

In some examples, the website 100 can enable the agent to move, resize, rotate, or otherwise spatially configure the image(s) within the design area 124. For instance, the website 100 may enable the agent to drag-and-drop images into a particular spatial arrangement within the design area 124. As another example, the website 100 may enable the agent to increase or decrease an image's size, for instance, by selecting a corner of the image in the design area 124 and dragging the corner outwardly to increase the image's size or inwardly to decrease the image's size. As another example, the website 100 may enable the agent to rotate an image, for instance, by selecting a corner of the image and dragging the corner in a clockwise or counterclockwise direction. In other examples, the website 100 can configure the images depending on the number of images in the design area 124. For example, the website 100 can spatially arrange the images into any of the configurations shown in FIG. 2 based on the number of images in the design area 124. If the agent accidentally adds an image to the design area 124, the website 100 can enable the agent to remove the image from the design area 124 by selecting an icon (e.g., an "X" icon) associated with the image.

Next, the agent can press a button 126 (e.g., "share button") configured to cause the website 100 to incorporate the arrangement of images into a draft chat message 130 in the chat window 104. The agent may then add additional content to the draft chat message. For example, the agent can add text to the draft chat message by entering the text into the data entry field 106. Once the agent is satisfied with the draft chat message, the agent can select a "send" button. In response, the website 100 can generate and transmit the chat message to the user. Generating the chat message may involve integrating metadata (e.g., hidden metadata) into the chat message, whereby the metadata indicates the characteristics of the images. For example, the metadata may indicate the relative positioning or spatial arrangement of the images, the sizes of the images, the orientations of the images, or any combination of these. This can enable the images to be properly displayed by the user's chat interface.

Although in FIG. 1 the design area 124 is part of the sidebar 128, in other examples the design area 124 can be part of the chat window 104 (e.g., within a chat message) or positioned elsewhere. In one such example, when the agent selects an initial item from the list 118, the website 100 can responsively create a draft chat message that includes an image of the item within a bounded area that serves as the design area 124. The agent may then be able to add other images of items to the chat message and manipulate the items within the bounded area.

Figure 3:
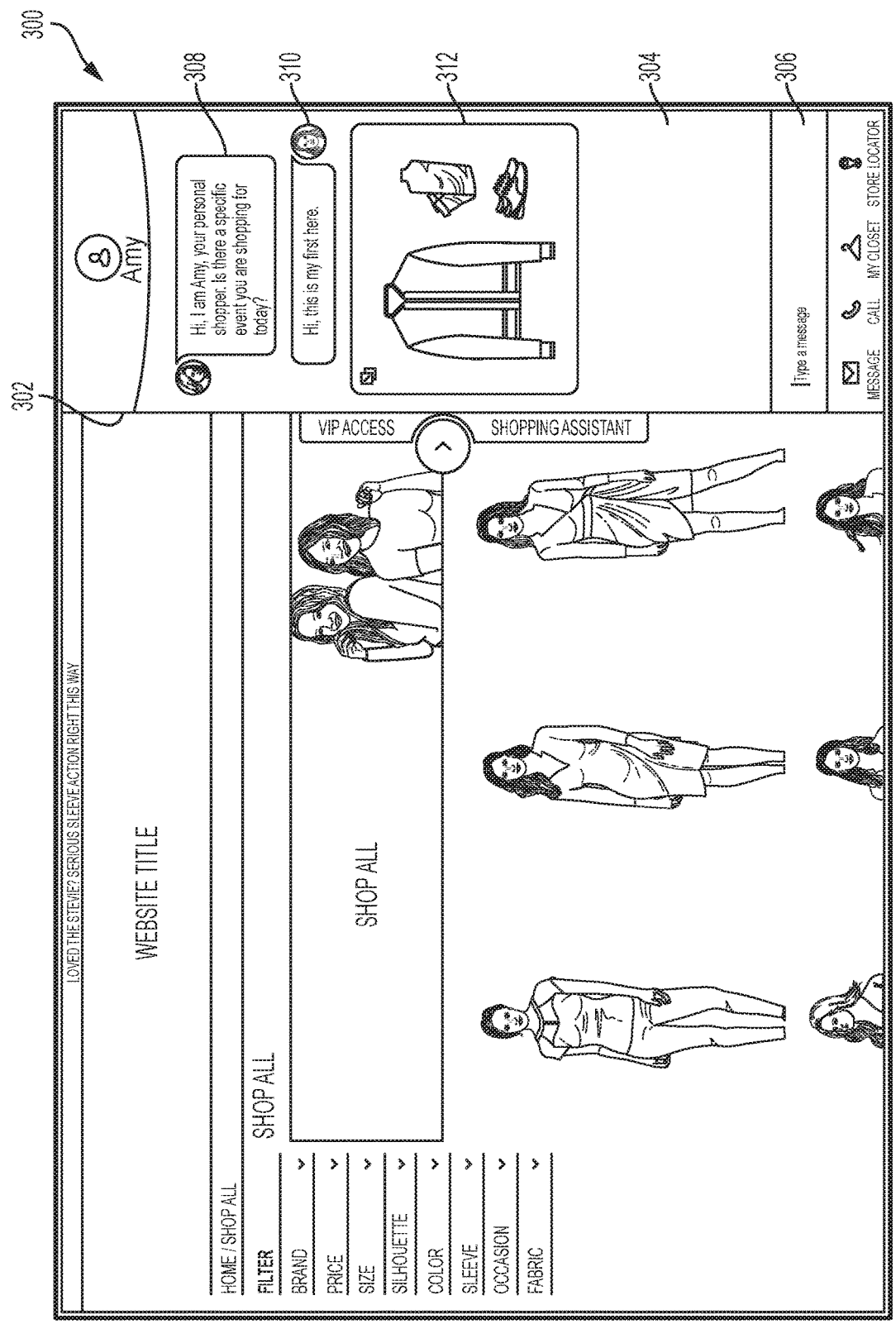
FIG. 3 shows an example of a website with a chat interface for implementing some aspects of the present disclosure.

FIG. 3 shows an example of a website 300 with a chat interface 302 for implementing some aspects of the present disclosure. The website 300 depicts a user's side of an underlying web-based platform through which a user may be able to purchase products.

The chat interface 302 includes a chat window 304 with a data entry field 306 through which the user can insert text to transmit in chat messages 308 to an agent. Each chat message can be displayed with an indicator 310 (e.g., a photo or username) of the person that sent the chat message. In this example, the chat window 304 substantially covers a vertical length of the website 300 and is positioned on the right side of the website 300, but other configurations and orientations are possible.

In the example shown in FIG. 3, the chat window 304 includes a chat message with a grouping 312 of images that depicts items. The images are spatially arranged and sized as designated by the agent via the agent's chat interface. This may help the user to visualize how the items in the images look together, for example, to coordinate an outfit.

Figure 4:
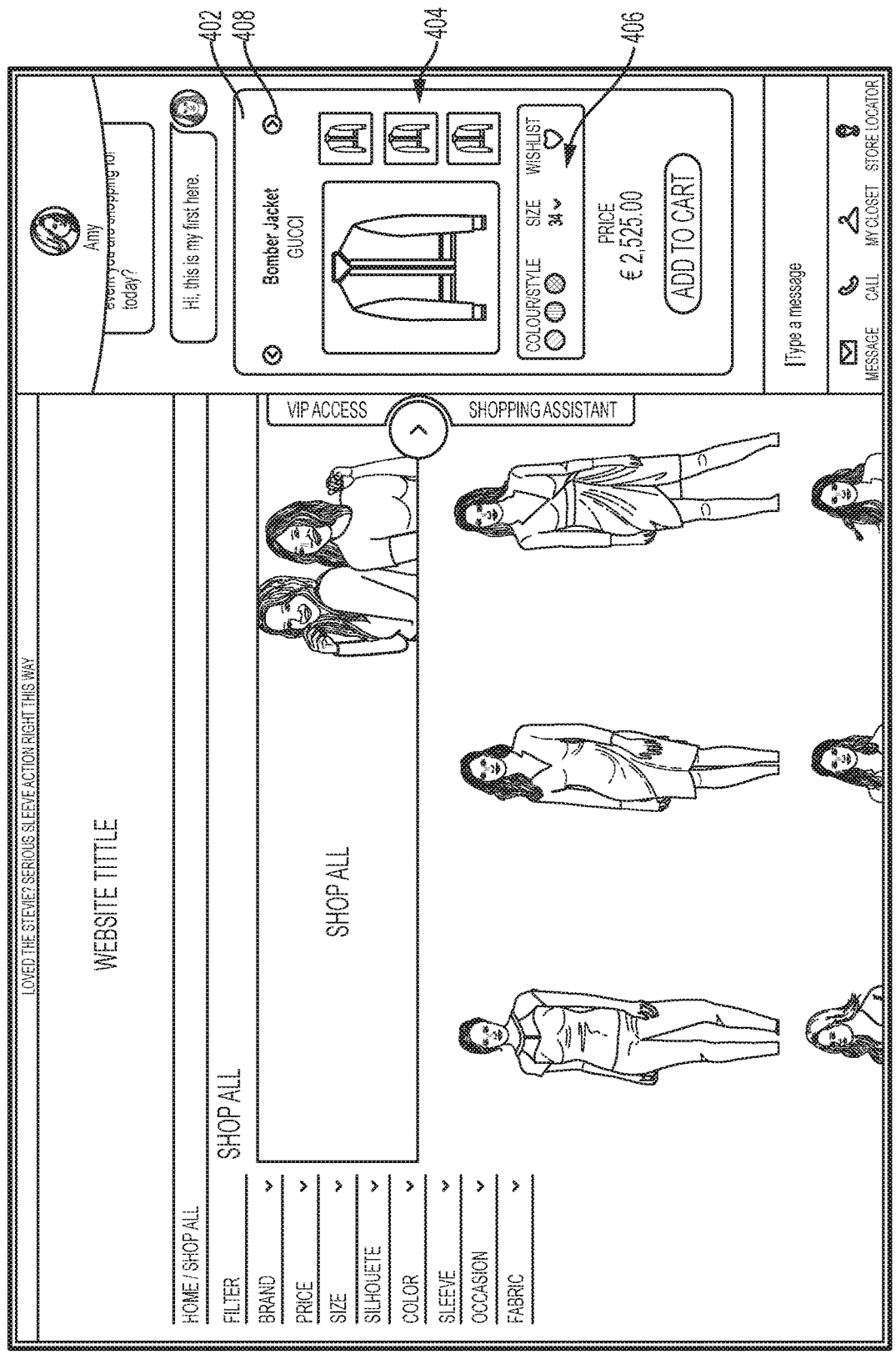
FIG. 4 shows an example of an image carousel according to aspects of the present disclosure.

In some examples, the website 300 may enable the user to interact with the grouping 312 of images. For example, the web site 300 can determine that the user selected the grouping 312 and responsively reorganize the images into an image carousel, for example the image carousel 402 shown in FIG. 4. Referring now to FIGS. 3-4 together, the image carousel 402 can display one item card 404 at a time within a bounding area defined by the chat window 304. The image carousel 402 can enable the user to selectively cycle through the item cards via arrows 408 (or the left/right arrows on a keyboard). Each item card 404 can relate to an image in the grouping 312 and include the image and additional information 406 about an item depicted in the image. In this example, the image is a product image and the item is a product. So, the additional information can include product data, such as a name of the item, a manufacturer of the item, a retailer of the item, a description of the item, a price of the item, the availability of the item, colors of the item, styles of the item, sizes of the item, a video about the item, additional images or views of the items, or any combination of these. The web site 300 may retrieve the additional information about the item from a database for display in the image carousel 402. Alternatively, the website 300 may retrieve the additional information about the item from the chat message, which may have the additional information embedded as metadata (e.g., hidden metadata). The item card 404 can also include options to add the item to a shopping cart and/or wish list. The image carousel 402 can enable a user to quickly review the items in the grouping 312 and learn more about each one.

In some examples, the web site 300 may enable the user to interact with each image in the grouping 312 individually. For example, the website 300 can determine that the user selected one of the images and responsively enlarge the image, display an item card 404 associated with the image, or both. This can enable a user to learn more about an individual item in the grouping 312.

In some examples, the web site 300 can detect the user interacting with an image in the grouping 312, or with the grouping 312 of images as a whole, and responsively transmit information about the interaction back to the agent's chat interface. For example, the website 300 can determine that the user has selected the grouping 312 of images and responsively transmit a chat message back to the agent's chat interface indicating that the user selected the grouping 312. As another example, the web site 300 can determine that the user is viewing a particular item card 404 in the image carousel 402 and responsively transmit a chat message back to the agent's interface indicating that the user is viewing the particular item card 404. As yet another example, the website 300 can determine that the user added an item depicted in the item card 404 to the user's wish list (or shopping cart) and responsively transmit a chat message back to the agent's interface so indicating. This can enable the agent to monitor the user's activity and engagement in substantially real time.

While the above examples describe certain functionality being implemented by a "website" for simplicity, it will be understood that this functionality can be implemented by a client device (e.g., using a website browser to navigate to the website), one or more servers associated with the website, or a combination thereof.

Figure 5:
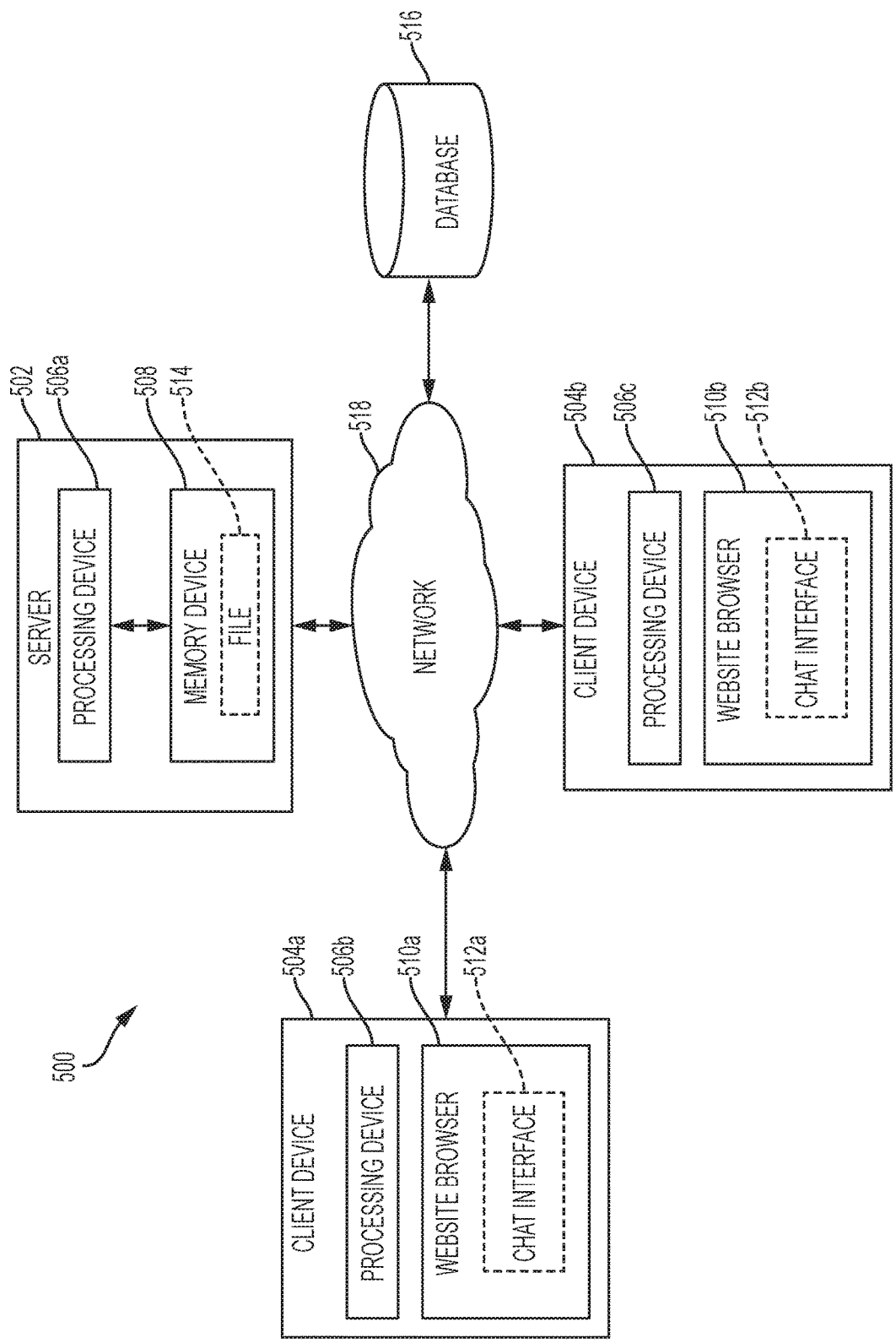
FIG. 5 is a block diagram of an example of a system for providing online chat-messages with configurable, interactive imagery according to some aspects.

Illustrative Systems and Methods for Providing Online Chat-Messages with Configurable, Interactive Imagery FIG. 5 is a block diagram of an example of a system 500 for providing online chat-messages with configurable, interactive imagery according to some aspects. The system 500 can implement any of the functionality described herein (e.g., discussed above). In this example, the system 500 includes a server 502 in communication with client devices 504a-b via a network 518, such as the Internet. The server 502 can effectuate chat sessions between the client devices 504a-b. A chat session can involve substantially real-time, two-way communications between client devices 504a-b.

The server 502 includes a processing device 506 interfaced with other hardware via a bus. A memory device 508, which can include any suitable tangible (and non-transitory) computer-readable medium such as RAM, ROM, EEPROM, or the like, may embody program components that configure operation of the server 502. The server 502 can further include one or more network interfaces, input/output (I/O) components (e.g., displays or keyboards), additional storage, or any combination of these.

The server 502 can enable the client devices 504a-b to transmit chat messages back-and-forth. For example, the server 502 can include an application programming interface (API) through which the client devices 504a-b can establish a chat session. One example of the API can be a representational state transfer (REST) API. Once the chat session is established, a user of a client device 504a can draft a chat message by typing a message into a data entry field of a chat interface 512a and/or selecting a combination of images to incorporate into the chat message. The user can also manipulate the images to spatially organize, rotate, or resize them. Once satisfied, the user can click a send button to transmit the chat message. The chat message may be routed through the server 502 to the other client device 504b. The other client device 504b can receive and display the chat message (e.g., with the images configured as designated by the user) via another chat interface 512b.

In some examples, the chat interfaces 512a-b are part of one or more websites displayed in website browsers 510a-b. For example, a user can navigate to a website using a web site browser 510a. The web site's code can directly include chat-interface code, which may include a mixture of JavaScript and Cascading Style Sheet (CSS) code, for generating the chat interface 512a. Alternatively, the website's code can include a reference to a file 514 hosted by the server 502 that includes the chat-interface code. An example of the file 514 can be a JavaScript file. Either way, the website browser 510a can obtain and interpret the chat-interface code to generate the chat interface 512a, for example, within a DIV or iFrame integrated with the web site's content. In alternative examples, the chat interfaces 512a-b can be plugins for the website browsers 510a-b or standalone software applications.

Although FIG. 5 only shows two client devices 504a-b, the system 500 can include any number and combination of client devices. Some examples of the client devices can include desktop computers or mobile devices, such as laptop computers, mobile phones, tablets, or wearable devices. Each of the client devices can include a processing device (e.g., processing devices 506b-c), memory device, network interface, I/O components, and additional storage, most of which are not shown in FIG. 5 for simplicity. In some examples, the client devices 504a-b are chat clients.

Also, although FIG. 5 only shows one server 502, the server 502 can represent any number and combination of servers (e.g., on-premise servers, off-premise servers, cloud servers, or any combination of these). For example, the server 502 can include a chat server configured to host chat sessions for multiple websites (e.g., owned by different companies), thereby providing centralized chat-management for several websites. The server 502 can additionally or alternatively include a webserver for serving website data to the client devices 504a-b. Examples of the website data can include account information or product data. The webserver may retrieve the website data from one or more databases, such as database 516, and serve the website data to the client devices 504a-b.

Figure 6:
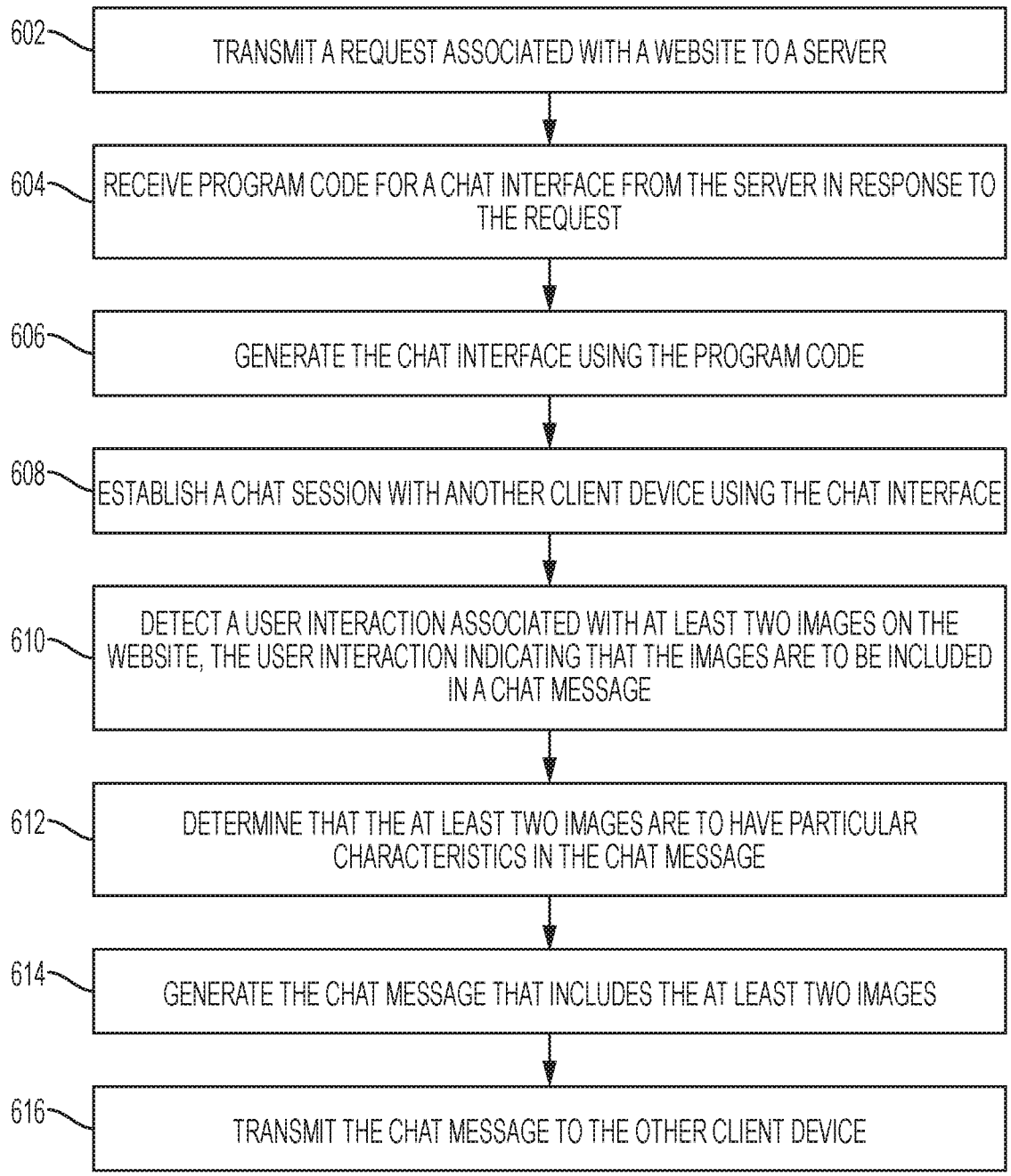
FIG. 6 is a flow chart of an example of a process for providing online chat-messages with configurable, interactive imagery according to some aspects.

FIG. 6 is a flow chart of an example of a process for providing online chat-messages with configurable, interactive imagery according to some aspects. Other examples can include more steps, fewer steps, different steps, or a different arrangement of the steps shown in FIG. 6. The steps below are described with reference to the components discussed above in FIG. 5.

In step 602, a client device 504*a* transmits a request associated with a website to a server 502. This may involve the agent's client device using a web site browser 510*a* to navigate to the website. Examples of the request can include a hypertext transfer protocol (HTTP) request, a socket-connection request, or another type of request.

In step 604, the client device 504*a* receives program code for a chat interface 512*a* from the server 502 in response to the request. The program code can include JavaScript, CSS, HTML, or any combination of these.

In step 606, the client device 504*a* generates the chat interface 512*a* using the program code. For example, the website browser 510*a* can interpret, compile, and/or run the program code to generate the chat interface 512*a*. The chat interface 512 can be integrated with a website within the website browser 510*a*.

In step 608, the client device 504*a* establishes a chat session with another client device 504*b* using the chat interface 512*a*. Establishing the chat session can involve generating at least a portion of a communication channel between the client devices 504*a-b* that may support bidirectional communication.

In one example, the client device 504*a* is an agent's client device and the other client device 504*b* is a user's client device. The agent's client device can establish the chat session in response to a request to initiate the chat session from the user's client device or the server 502. For example, a user may be shopping for clothing items on a website that has an integrated chat interface. The user can click a "start" button of the chat interface to initiate a chat session with the agent, for example, to obtain help in pairing clothing items. The user's chat interface can detect that the start button was clicked and responsively transmit a command to the server 502. In response to the command, the server 502 can determine that the agent is available and transmit a request to the agent's client device to initiate the chat session. In some examples, the agent's client device automatically approves the request and initiates the chat session. In other examples, the agent's client device prompts the agent about the request. If the agent approves the request, the agent's client device initiates the chat session.

In step 610, the client device 504*a* detects a user interaction associated with at least two images on the website. The user interaction can indicate that the at least two images are to be included in a chat message. For example, the client device 504*a* can detect a selection of the images from an electronic catalogue of items presented on the underlying website with which the chat interface 512*a* is integrated. The images can depict items (e.g., products) for sale on the web site.

In step 612, the client device 504*a* determines that the at least two images are to have certain characteristics (e.g., shapes, sizes, orientations, spatial positions, or any combination of these) in the chat message.

In some examples, the client device 504*a* determines that the images are to have certain characteristics in the chat message based on user input. For example, the client device 504*a* can receive user input indicating that the images are to have certain sizes. As another example, the client device 504*a* can receive user input indicating that the images are to be spatially positioned relative to one another in a particular configuration within the chat message, or both. So, the client device 504*a* can configure the images to have the sizes and/or spatial positions input by the user.

Alternatively, client device 504*a* can determine that the images are to have certain characteristics in the chat message based on image features (e.g., the content, sizes, or types of the images). In one such example, the client device 504*a* can work alone or in concert with the server 502 to analyze the images, determine that they depict certain items, and spatially organize the images based on the items depicted. For instance, the client device 504*a* work in concert with the server 502 to analyze the images and thereby determine that one image depicts a necklace and the other image depicts a shirt. Since necklaces typically overlay shirts, the client device 504*a* can overlay the image of the necklace on the image of the shirt. As another example, the client device 504*a* work in concert with the server 502 to analyze the images and thereby determine that both images depict pants. Since pants are typically laid side-by-side for comparison, the client device 504*a* can arrange the images to be side-by-side. As yet another example, the client device 504*a* can determine that both images have solid backgrounds (e.g., as opposed to transparent backgrounds), such that overlaying the images would cause the bottom image to be substantially obscured. So, the client device 504*a* can arrange the images such that they are non-overlapping.

In some examples, the client device 504*a* can determine a spatial configuration for the images based on the number of images in the chat message. For example, client device 504*a* can select a particular default-arrangement for the images (e.g., from among the default options shown in FIG. 3) depending on the number of images that are included in the chat message.

In block 614, the client device 504*a* generates a chat message that includes the at least two images. The client device 504*a* can generate the chat message using the chat interface 512*a*.

In some examples, generating the chat message can involve including metadata into the chat message configured to cause the images to have the characteristics determined in step 612. For example, the client device 504*a* can embed metadata into the chat message indicating the spatial positions (e.g., the relative spatial configuration) that the images are to have in the chat message. Additionally or alternatively, the client device 504*a* can embed metadata into the chat message indicating a size that an image is to have in the chat message, a rotation that an image is to have in the chat message, or both.

In some examples, generating the chat message can involve including additional information about an item shown in one of the images into the chat message. For example, as an agent is chatting with the user via her chat interface, the agent can browse the underlying website to identify items that the agent wishes to send to the user. Each item can have a photo and additional information, such as a price, star rating, description, color, and/or size of the item. As the agent selects various items, the client device 504*a* can detect the selections and responsively incorporate the photos of the items into a chat message. The client device 504*a* can also retrieve the additional information by extracting it from the website's content or by obtaining it from a database 516. The client device 504*a* can then incorporate the additional information into the chat message as invisible metadata or as visible text.

In step 616, the client device 504*a* transmits the chat message to the other client device 504*b* (e.g., a remote client device). This may involve transmitting the chat message to the server 502 (e.g., using an API command, such as a REST API command), which may route the chat message to the other client device 504b.

Figure 7:
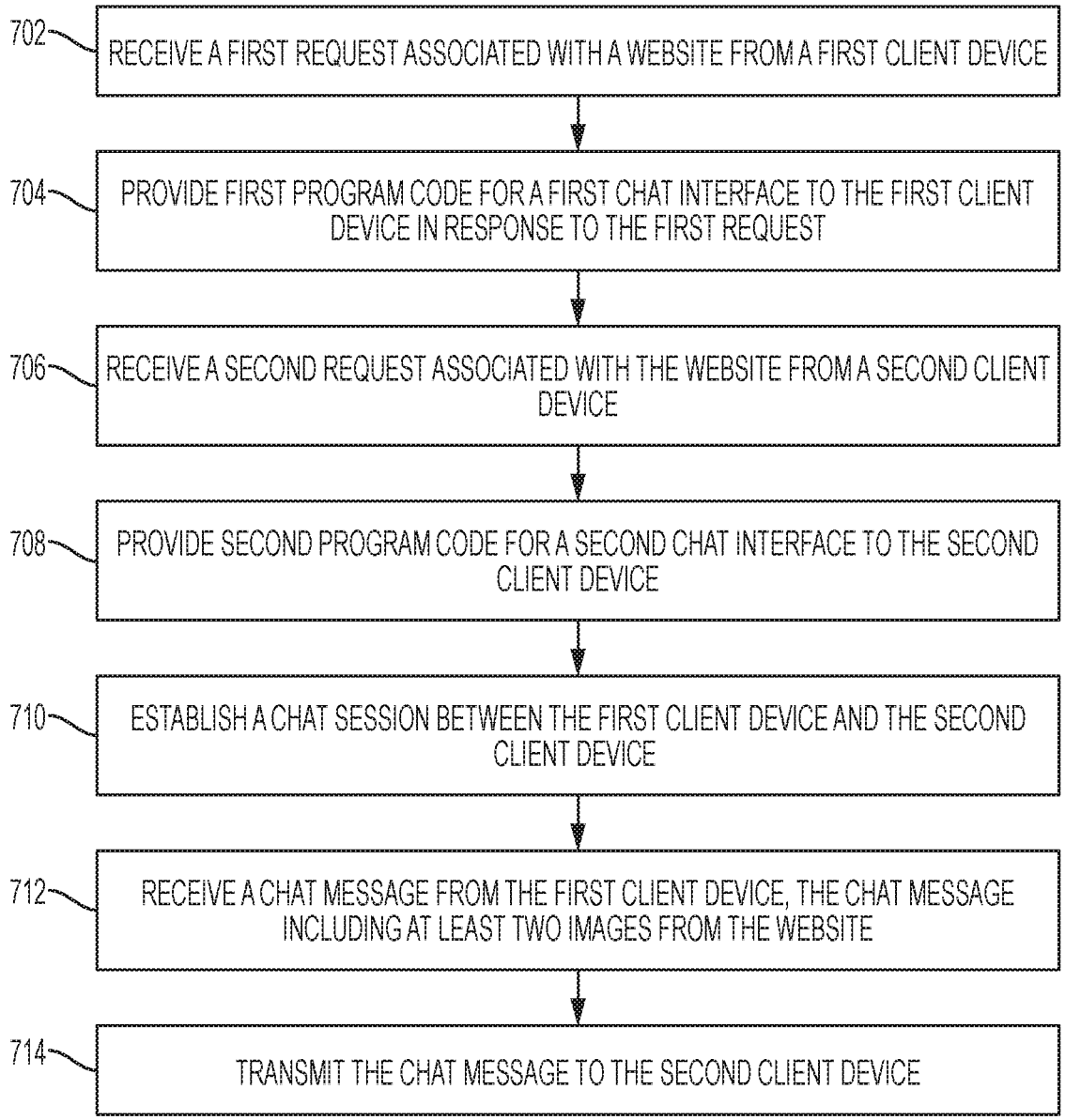
FIG. 7 is a flow chart of another example of a process for providing online chat-messages with configurable, interactive imagery according to some aspects.

FIG. 7 is a flow chart of an example of a process for providing online chat-messages with configurable, interactive imagery according to some aspects. Other examples can include more steps, fewer steps, different steps, or a different arrangement of the steps shown in FIG. 7. The steps below are described with reference to the components discussed above in FIG. 5.

In step 702, a server 502 receives a first request associated with a website from a first client device 504a. Examples of the first request can include a hypertext transfer protocol (HTTP) request, a socket-connection request, or another type of request. In some examples, the first request can be configured to retrieve website code (e.g., HTML, Javascript, and/or CSS) for the website. In some such examples, the first request can be transmitted via a website browser 510a of the first client device 504a.

In step 704, the server 502 provides first program code for a first chat interface 512a to the first client device 504a in response to the first request. For example, the server 502 can provide the website code in response to the first request, whereby the website code includes the first program code for the first chat interface 512a.

Figure 2:
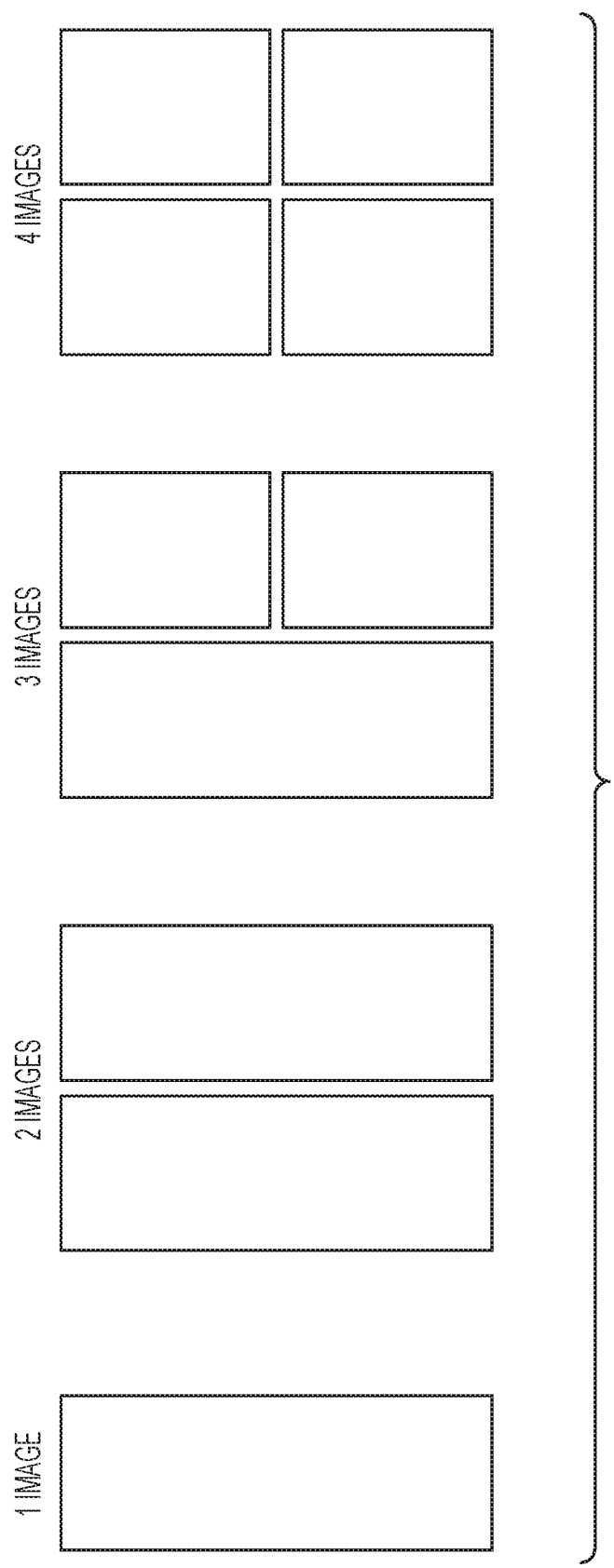
FIG. 2 is an example of default configurations for images according to some aspects.

The first program code can cause the first chat interface 512a to implement any number and combination of the features discussed herein (e.g., with respect to FIGS. 1-2). For example, the first program code can cause the first chat interface 512a to be integrated with the website within a website browser 510a. And first the program code can enable a user to selectively include at least two images from the website (e.g., embedded in the website) into a chat message.

In some examples, first program code for the first chat interface 512a is configured to enable a user to spatially position the at least two images relative to one another in a particular configuration. For example, the first program code can enable the first chat interface 512a to have a design area in which a user can spatially position the at least two images relative to one another in the particular configuration (e.g., by dragging-and-dropping the at least two images).

In step 706, the server 502 receives a second request associated with the website from a second client device 504b. Examples of the second request can include a HTTP request, a socket-connection request, or another type of request. In some examples, the second request can be configured to retrieve website code for the website. In some such examples, the second request can be transmitted via a web site browser 510b of the second client device 504b.

In step 708, the server 502 provides second program code for a second chat interface 512b to the second client device 504b in response to the second request. For example, the server 502 can provide the website code in response to the second request, whereby website code includes the second program code for the second chat interface 512b. The second program code can be the same as or different from the first program code.

The second program code can cause the second chat interface 512b to implement any number and combination of the features discussed herein (e.g., with respect to FIGS. 3-4). For example, the second program code can cause the second chat interface 512b to be integrated with the website within a website browser 510b. In one such example, the second program code can generate a chat window overlapping at least a portion of the website within the website browser 510b, whereby the chat window can display a chat message with images in a predetermined configuration. Additionally, the second program code can enable the second chat interface 512b to reorganize the images in the chat message into an image carousel in response to a user interaction with the images. The second program code may additionally or alternatively cause the second chat interface 512b to detect a user interaction associated with an image in a chat message and responsively transmit information describing the user interaction back to the first client device 504a. The user interaction can involve expanding a size of the image, contracting the size of the image, playing a video associated with the image, manipulating an image carousel, adding a product shown in the image to a wish list, or adding the product shown in the image to a shopping cart.

In step 710, the server 502 establishes a chat session between the first client device 504a and the second client device 504b. Establishing the chat session can involve generating at least a portion of a communication channel between the client devices 504a-b that may support bidirectional communication. In some examples, the server 502 can establish one or more TCP/IP connection via one or more sockets to create the chat session.

In step 712, the server 502 receives a chat message from the first client device 504a. The chat message can include at least two images from the website. The chat message may also include information about products shown in the images. Examples of the information can include the sizes, colors, and/or prices of the products. In some cases, the information can be included as hidden metadata in the chat message.

The chat message can additionally or alternatively include metadata for spatially positioning the at least two images relative to one another in a particular configuration at the second client device 504b. The particular configuration can be designated by the user of the first client device 504a (e.g., via the first chat interface 512a).

In step 714, the server 502 transmits the chat message to the second client device 504b.

General Considerations

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process that is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered. Accordingly, the above description does not bound the scope of the claims.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

Embodiments in accordance with aspects of the present subject matter can be implemented in digital electronic circuitry, in computer hardware, firmware, software, or in combinations of the preceding. In one embodiment, a computer may comprise a processor or processors. The processor comprises or has access to a computer-readable medium, such as a random access memory (RAM) coupled to the processor. The processor executes computer-executable program instructions stored in memory, such as executing one or more computer programs including a sensor sampling routine, selection routines, and other routines to perform the methods described above.

Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example tangible computer-readable media, that may store instructions that, when executed by the processor, can cause the processor to perform the steps described herein as carried out, or assisted, by a processor. Embodiments of computer-readable media may comprise, but are not limited to, all electronic, optical, magnetic, or other storage devices capable of providing a processor, such as the processor in a web server, with computer-readable instructions. Other examples of media comprise, but are not limited to, a floppy disk, CD-ROM, magnetic disk, memory chip, ROM, RAM, ASIC, configured processor, all optical media, all magnetic tape or other magnetic media, or any other medium from which a computer processor can read. Also, various other devices may comprise computer-readable media, such as a router, private or public network, or other transmission device. The processor, and the processing, described may be in one or more structures, and may be dispersed through one or more structures. The processor may comprise code for carrying out one or more of the methods (or parts of methods) described herein.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

The invention claimed is:

1. A method comprising:
    receiving, by a server, a request associated with a website from a first client device;
    providing, by the server, program code for a first chat interface to the first client device in response to the request, wherein the program code is configured to cause the first chat interface to be integrated with the website within a website browser and to enable a user to selectively include at least two images from the website into a chat message, and wherein the first chat interface is configured to receive a user customization as to how to display the at least two images within the chat message and incorporate metadata into the chat message based on the user customization, the metadata being configured to cause the at least two images to be displayed in accordance with the user customization in a second chat interface;
    establishing, by the server, a chat session between the first client device and a second client device that comprises the second chat interface;
    receiving, by the server, the chat message from the first client device, the chat message including the at least two images from the website and the metadata; and
    transmitting, by the server, the chat message to the second client device.

2. The method of claim 1, wherein the request is configured to retrieve website code for the website from the server, and wherein the server is configured to provide the website code back to the first client device in response to the request, the website code including the program code for the first chat interface.

3. The method of claim 2, wherein the request is a hypertext transfer protocol (HTTP) request or a socket-connection request.

4. The method of claim 1, wherein the first client device is a first chat client and the second client device is a second chat client.

5. The method of claim 1, wherein the chat message further includes hidden metadata about a product shown in an image among the at least two images, the hidden metadata comprising a size, color, availability, or price of the product in the image.

6. The method of claim 1, wherein the user customization comprises a particular spatial configuration of the at least two images relative to one another, and wherein the metadata is configured to cause the at least two images to be positioned relative to one another in the particular spatial configuration at the second chat interface.

7. The method of claim 6, wherein the program code for the first chat interface is configured to enable the user to input the particular spatial configuration of the at least two images by dragging-and-dropping the at least two images within a designated area of the first chat interface.

8. The method of claim 6, wherein the particular spatial configuration includes a first image overlaying a second image, and wherein the first image and second image depict consumer products.

9. The method of claim 1, further comprising:
providing, by the server, second program code for the second chat interface to the second client device, wherein the second program code is configured to cause the second chat interface to receive the chat message and display the at least two images in a predetermined configuration within a chat window based on the metadata in the chat message.

10. The method of claim 9, wherein the second program code for the second chat interface is configured to cause the second chat interface to:
reorganize the at least two images into an image carousel within a chat window in response to a user interaction with the at least two images.

11. The method of claim 9, wherein the second program code for the second chat interface is configured to cause the second chat interface to:
detect a user interaction associated with an image among the at least two images in the chat message; and
in response to detecting the user interaction, transmit information describing the user interaction back to the first client device.

12. The method of claim 11, wherein the user interaction involves expanding a size of the image, contracting the size of the image, playing a video associated with the image, manipulating an image carousel, adding a product shown in the image to a wish list, or adding the product shown in the image to a shopping cart.

13. The method of claim 9, wherein the second program code for the second chat interface is configured to cause the second chat interface to:
determine that a website browser is to be navigated to a particular webpage; and
in response to determining that the website browser is to be navigated to the particular webpage, transmit another chat message that includes an identifier of the particular webpage back to the first client device.

14. A system comprising:
a processing device; and
a memory device that includes instructions executable by the processing device for causing the processing device to:
receive a request associated with a website from a first client device;
provide program code for a first chat interface to the first client device in response to the request, wherein the program code is configured to cause the first chat interface to be integrated with the website within a website browser and to enable a user to selectively include at least two images from the website into a chat message, and wherein the first chat interface is configured to receive a user customization as to how to display the at least two images within the chat message and incorporate metadata into the chat message based on the user customization, the metadata being configured to cause the at least two images to be displayed in accordance with the user customization in a second chat interface;
establish a chat session between the first client device and a second client device that comprises the second chat interface;
receive the chat message from the first client device, the chat message including the at least two images from the website and the metadata; and
transmit the chat message to the second client device.

15. The system of claim 14, wherein the chat message further includes hidden metadata about a product shown in an image among the at least two images.

16. The system of claim 14, wherein the user customization comprises a particular spatial configuration of the at least two images relative to one another, and wherein the program code for the first chat interface is configured to enable the user to spatially position the at least two images in the particular spatial configuration by dragging-and-dropping the at least two images within the first chat interface.

17. The system of claim 14, wherein the memory device further includes instructions that are executable by the processing device for causing the processing device to:
provide second program code for the second chat interface to the second client device, wherein the second program code is configured to cause the second chat interface to receive the chat message and display the at least two images in a predetermined configuration within a chat window based on the metadata in the chat message.

18. The system of claim 17, wherein the second program code for the second chat interface is configured to cause the second chat interface to:
reorganize the at least two images into an image carousel within a chat window in response to a user interaction with the at least two images.

19. The system of claim 17, wherein the second program code for the second chat interface is configured to cause the second chat interface to:
detect a user interaction associated with an image among the at least two images in the chat message; and
in response to detecting the user interaction, transmit information describing the user interaction back to the first client device.

20. The system of claim 17, wherein the second program code for the second chat interface is configured to cause the second chat interface to:
determine that a website browser is to be navigated to a particular webpage; and
in response to determining that the website browser is to be navigated to the particular webpage, transmit another chat message that includes an identifier of the particular webpage back to the first client device.

21. A non-transitory computer-readable medium comprising instructions that are executable by a processing device for causing the processing device to:
generate a chat interface that is integrated with a website within a website browser;
subsequent to generating the chat interface, detect user interactions with at least two images on the website;
in response to detecting the user interactions, generate a chat message that includes the at least two images within the chat interface;
receive a user customization as to how to display the at least two images within the chat message;

incorporate metadata into the chat message based on the user customization, the metadata being configured to cause the at least two images to be displayed in accordance with the user customization in another chat interface of a remote client device; and transmit the chat message to the remote client device using the chat interface.

22. The non-transitory computer-readable medium of claim 21, wherein the user interactions comprise a user selecting the at least two images on the website, the user customization comprises a particular spatial configuration of the at least two images relative to one another, and the metadata indicates that the at least two images are to have the particular spatial configuration relative to one another.

* * * * *